(12) United States Patent
Morath

(10) Patent No.: US 10,138,095 B2
(45) Date of Patent: *Nov. 27, 2018

(54) MOBILE CRANE

(71) Applicant: Liebherr-Werk Ehingen GmbH, Ehingen/Donau (DE)

(72) Inventor: Erwin Morath, Lauterach (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 962 days.

This patent is subject to a terminal disclaimer.

(21) Appl. No.: 14/294,512

(22) Filed: Jun. 3, 2014

(65) Prior Publication Data

US 2014/0277969 A1 Sep. 18, 2014

Related U.S. Application Data

(62) Division of application No. 11/132,641, filed on May 18, 2005, now Pat. No. 8,777,027.

(30) Foreign Application Priority Data

May 19, 2004 (DE) .................... 20 2004 008 083 U

(51) Int. Cl.
*B66C 13/18* (2006.01)
*B66C 13/16* (2006.01)
(Continued)

(52) U.S. Cl.
CPC .............. *B66C 13/18* (2013.01); *B66C 13/16* (2013.01); *B66C 13/46* (2013.01); *B66C 23/72* (2013.01); *B66C 23/78* (2013.01); *B66C 23/825* (2013.01)

(58) Field of Classification Search
CPC ......... B66C 13/16; B66C 13/18; B66C 13/46; B66C 13/40; B66C 13/44; B66C 15/06;
(Continued)

(56) References Cited

U.S. PATENT DOCUMENTS 4,973,219 A 11/1990 Brickner et al.
6,061,617 A 5/2000 Berger et al.
(Continued)

FOREIGN PATENT DOCUMENTS

CN 1139413 A 1/1997
DE 19830981 C1 9/1999
(Continued)

OTHER PUBLICATIONS

ISA European Patent Office, Search Report of EP05010765, dated Apr. 18, 2011, Netherlands, 3 pages.

*Primary Examiner* — Michael R Mansen
*Assistant Examiner* — Juan J Campos, Jr.
(74) *Attorney, Agent, or Firm* — McCoy Russell LLP

(57) ABSTRACT

The present application relates to a mobile crane comprising a telescopic boom which has a hinged section and at least one telescopic section which can be telescoped out of it, or to a crawler-mounted crane. In accordance with one embodiment, as a position detection device, it has at least one transducer in the form of an inductively operating transponder, a receiver unit for the sensing of the position of the transducer, a control device for control in dependence on a signal of the receiver unit, as well as a signal transmission device in the form of a databus for the transmission of the signal data from the receiver unit to the control device.

20 Claims, 4 Drawing Sheets

(51) Int. Cl.
*B66C 13/46* (2006.01)
*B66C 23/72* (2006.01)
*B66C 23/78* (2006.01)
*B66C 23/82* (2006.01)

(58) Field of Classification Search
CPC ....... B66C 15/065; B66C 23/70; B66C 23/60;
B66C 23/605; B66C 23/88; B66C 23/90;
B66C 23/905
USPC .......................... 212/276, 270, 177; 340/685
See application file for complete search history.

(56) References Cited

U.S. PATENT DOCUMENTS

| | | |
|---|---|---|
| 6,474,486 B1 | 11/2002 | Baraniak |
| 6,886,651 B1 | 5/2005 | Slocum et al. |
| 2004/0148716 A1 | 8/2004 | Hutton |
| 2005/0086927 A1 | 4/2005 | Lair et al. |

FOREIGN PATENT DOCUMENTS

| | | |
|---|---|---|
| FR | 2490419 A1 | 3/1982 |
| FR | 2517659 A1 | 6/1983 |
| JP | 04045097 A | 2/1992 |
| JP | 07168985 A | 7/1995 |
| JP | 08301578 A | 11/1996 |
| JP | 09156478 A | 6/1997 |
| JP | 10236778 A | 9/1998 |
| JP | 11106182 A | 4/1999 |
| JP | 11106183 A | 4/1999 |
| JP | 2003118979 A | 4/2003 |
| WO | 9206349 A2 | 4/1992 |

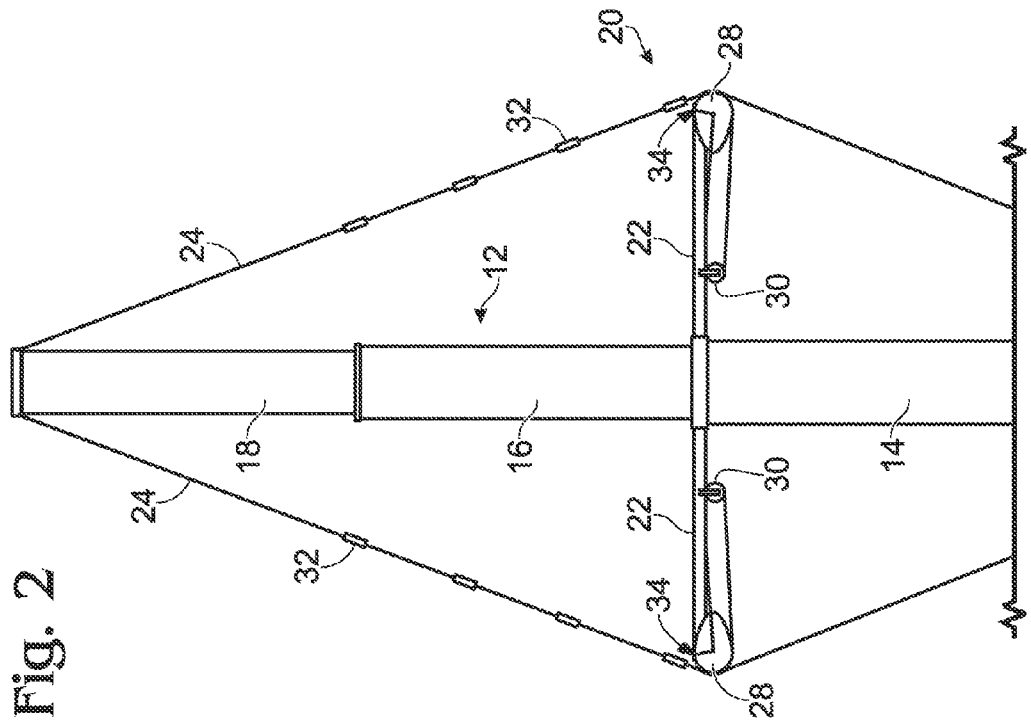
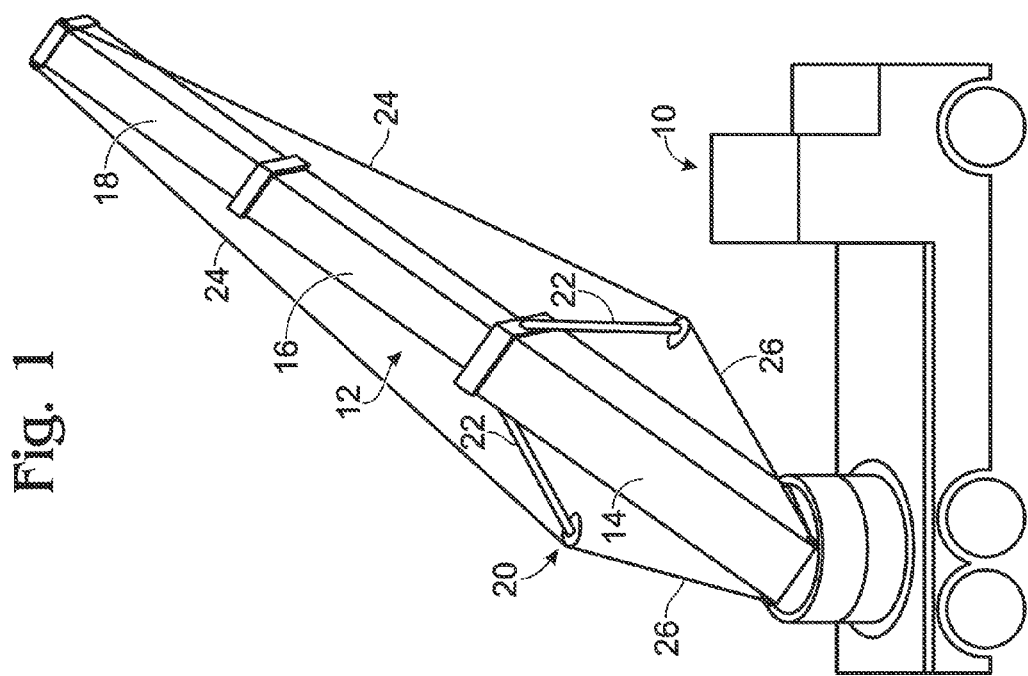

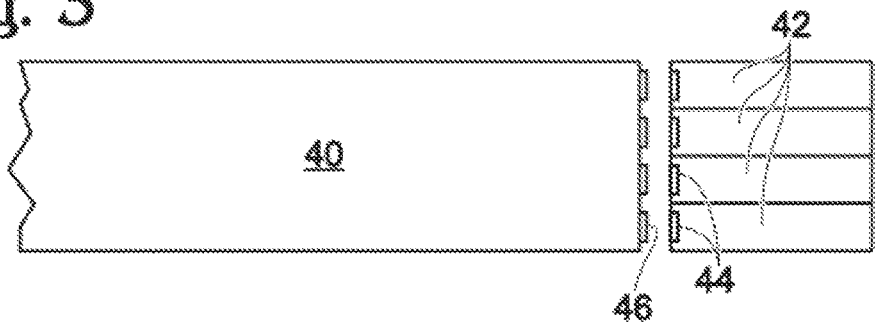
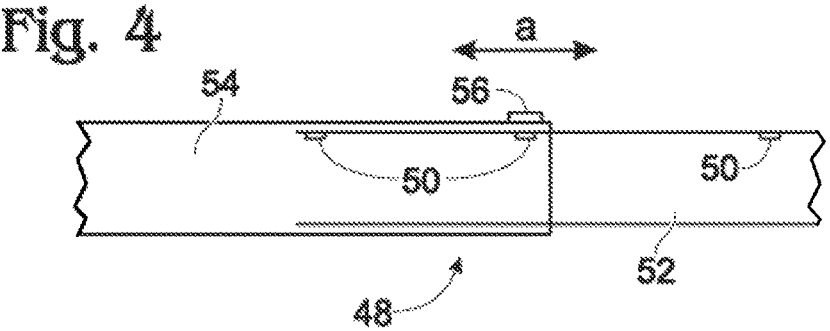
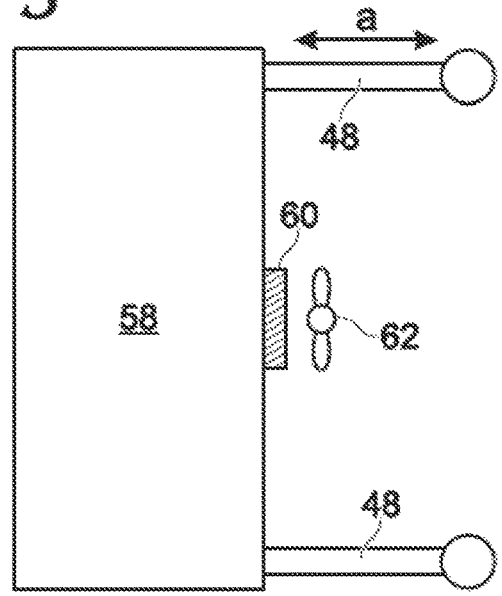

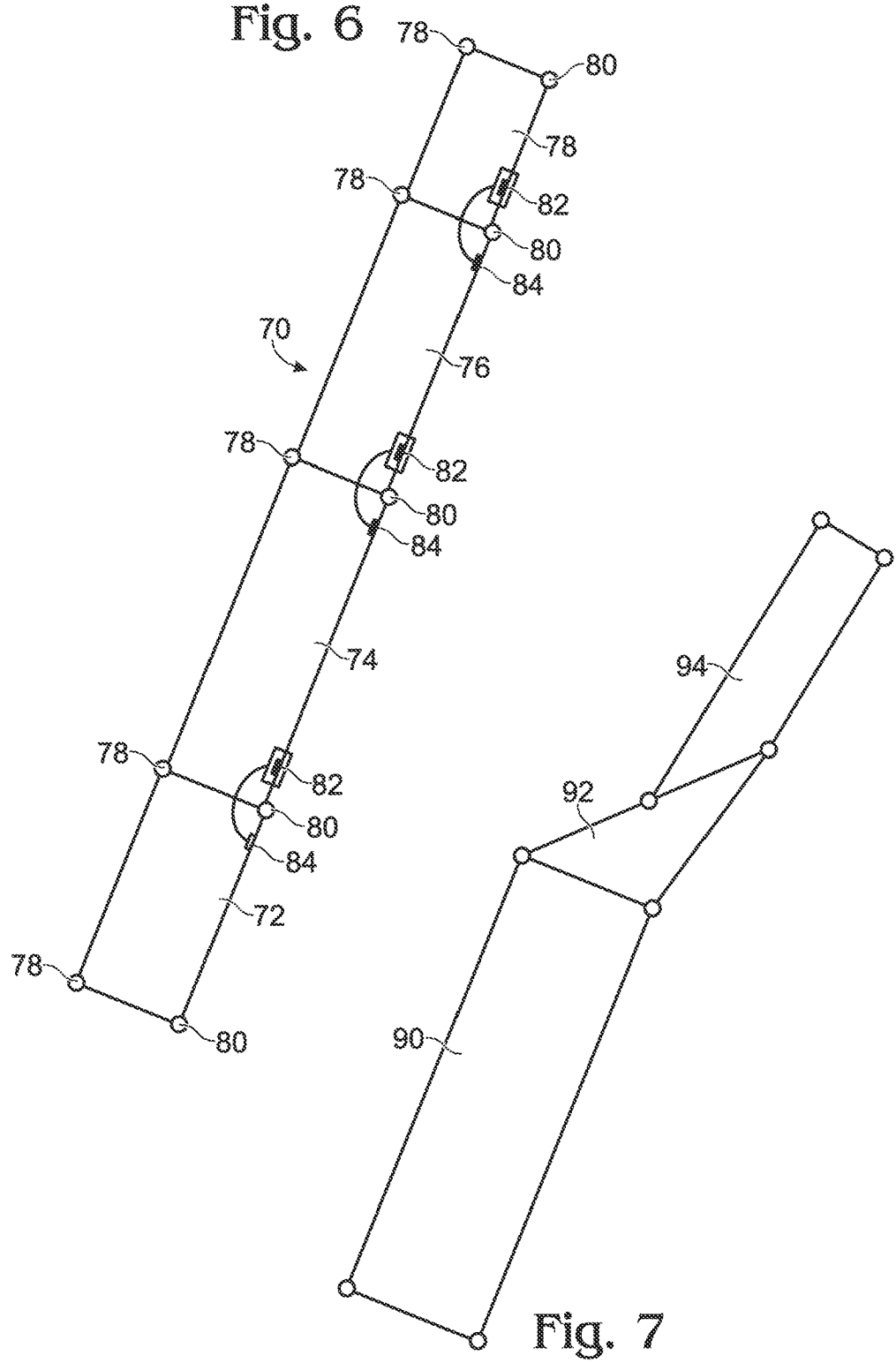

US 10,138,095 B2

MOBILE CRANE

CROSS REFERENCE TO RELATED APPLICATION

The present application is a continuation of U.S. patent application Ser. No. 11/132,641, entitled "MOBILE CRANE," filed May 18, 2005, which claims priority to German Utility Model Application Serial No. 20 2004 008 083.4, entitled "A MOBILE CRANE", filed May 19, 2004, the entire contents of each of which are hereby incorporated by reference for all purposes.

TECHNICAL FIELD

The present application relates to a mobile crane having a telescopic boom which has a hinged section and at least one telescopic section which can be telescoped out of it, or to a crawler-mounted crane.

BACKGROUND AND SUMMARY

With conventionally used mobile cranes or crawler-mounted cranes a series of data is sensed in the electronic control and monitoring system. These are, for example, data with respect to the setup conditions, to the added counter-weights, to the extended position of the stabilizer plates and to many other things. The respective data are sensed by different detection systems and are input automatically in part, but also manually in part. The respective setup condition of the boom is, for example, thus typically entered into the computer by the operator by hand. The computer then calculates the possible maximum load-bearing capacities with reference to the correspondingly entered values.

In another application, the extended position of the stabilizer plates is sensed by a corresponding sensor system. Here, for example, the length of a running tape measure is sensed which is secured to the telescopic end of the plate and is refracted and extended with it.

It is the object of the present application to provide a mobile crane or a crawler-mounted crane comprising a state or position detection device which unambiguously detects pre-defined states or positions and passes them reliably on to the electronic control system.

In accordance with one embodiment, this object may be solved by means of a mobile crane or of a crawler-mounted crane comprising at least one transducer in the form of a inductively acting transponder, a receiver unit for the sensing of the position of the transducer, a control device for controlling in dependence on a signal of the receiver unit, as well as a signal transmission device in the form of a databus for the transmission of the signal data from the receiver unit to the control device are used as a position detection device.

Correspondingly inductively acting transponders having receiver units are typically also called RFID systems, i.e. radio frequency identification systems. Such RFID systems are generally already known in the most varied application areas. These RIFD systems have a transponder which, on excitation by corresponding signals, inductively transmits information as an RF signal to a receiver unit. The receiver unit, which is also called a reader, contains a digital electronic system which controls the transponder such that it transmits back the information stored on it as modulated RF signals. This information received by the transponder is supplied in one embodiment via a databus to the control device of the mobile crane. In one example, a state and position detection device of this kind can be used in different positions in the mobile crane.

Since it is of special importance in a mobile crane that the detection devices of this kind work without error, for the self-check of the functioning of the receiver unit, a transponder may be fixedly installed in it in accordance with an advantageous aspect which transmits a pre-determined function signal for the continuous monitoring of the functioning of the position detection device. If therefore the specific signal transmitted by the fixedly associated transponder is no longer received here, an interference event signal is generated in the control computer so that this malfunction cannot remain unnoticed in the operation of the mobile crane.

Further preferred embodiments of the invention result from the further subordinate claims dependent on the main claim.

In accordance with a particularly advantageous embodiment variant, the position detection device can be used with a guy-rope in the form of a rope length adjustment apparatus. This length adjustment apparatus has a rope-holding apparatus for the adjustment of a desired rope length of the guy-rope, with the rope length adjustment apparatus having at least one transducer secured to the guy-rope whose positions can be sensed by the receiver unit and with the control device controlling the rope-holding apparatus in dependence on a signal of the receiver unit 1.

The mobile crane or crawler-mounted crane can advantageously have a guying for the telescopic boom which has at least one guy support supported on one of the sections, a guy-rope supported by the guy support and a rope length adjustment apparatus in accordance with the previously described solution.

The receiver unit can be arranged at the guy support. A rope winch for the hauling in of the guy-rope can advantageously be provided which is preferably arranged on the guy support and can be controlled in dependence on the signal of the receiver unit. This rope winch can form the rope-holding apparatus.

The at least one transducer can be integrated in a ring seated on the guy-rope. Such a ring can be pressed onto the rope at a pre-determined position.

Two guy supports can advantageously be provided which are spread apart in a V shape in an operating position and a guy-rope can run over each guy support, with transducers preferably being secured to each guy-rope, preferably to rope sections respectively corresponding to equal rope lengths of the guy-ropes. Due to the position detection device provided here, it can be precisely determined by how much the respective guy-rope has been tensioned by the corresponding transponders moving over the receiver devices so that the precise and symmetrical positioning of the guy supports can hereby be set.

Another preferred aspect of the invention consists of a transducer being arranged at least at one ballast element from which a signal corresponding to the ballast can be transmitted to a receiver unit.

The receiver unit can be integrated into a region of the mobile crane chassis on which the at least one weight can be placed. A plurality of receiver devices can also be arranged at corresponding positions of the mobile crane chassis which can then communicate with associated transponders after the corresponding placing on of weights. Alternatively, a receiver device can also be arranged in a portable unit which is guided along the placed-down weights by the operator in order to pick up the corresponding data from the respective transponders of the weights. These data can then, for example, be input into the control device of the mobile crane via a radio connection.

The receiver unit can also be arranged in a region of the crane boom on which the at least one weight can be suspended. Communication takes place here with the associated transponders after a corresponding suspension of the weights. These data can, as already described above, be transmitted to the control device of the mobile crane so that the precise ballast adjustment of the boom can be sensed here.

In accordance with another advantageous aspect of the invention, transducers can be arranged at the extensible stabilizer plates, with corresponding receiver units being arranged at the vehicle chassis. Transducers, i.e. transponders, are advantageously arranged at predetermined positions at every stabilizer plate so that the precise position of the support plate can be determined by the respective receiver unit. The position can be precisely determined both with respect to the sliding spars extensible horizontally to the vehicle and with respect to the vertically extensible support plates. In addition, it is possible to measure at each stabilizer plate whether it is under load.

A further preferred aspect of the invention relates to a setup element detection, for example of lattice elements of a derrick boom. A respective transducer, i.e. transponder, is arranged at the respective setup elements. After a corresponding assembly of the individual setup elements, the setup condition can be determined by reading out the signals from the transponders. For this purpose, receiver units can advantageously be arranged at the adjacent elements and are connected to the control computer of the mobile crane via a bus system. The precise geometric configuration can be determined with reference to the corresponding setup condition data in the control computer. Weight distributions within the boom can hereby be calculated in a simple manner with great precision.

Yet another embodiment variant of the invention contains a mobile transducer which cooperates with a receiver unit which is arranged at a specific position on the mobile crane in order to detect a safe position of an operator and to release predetermined actions of the mobile crane. The occupational safety of the operator is hereby substantially increased. The problem previously existed that, for example on a remote control of the crane, the operator could be hit and injured by retracting or extending stabilizer plates. Since the operator has to stand in the close region of a receiver unit through the transponder or transducer, it can now be ensured by a corresponding arrangement of the receiver unit that the operator is standing outside the danger zone. The remote control is only released in the embodiment shown here in this correspondingly defined region. This means that the operator cannot operate the blocked remote control in a region in which the transducer he is carrying does not exchange data with the receiver unit. Only in the region in which the transducer transmits its data to the receiver unit is the remote control released and thus the safety of the operator ensured.

BRIEF DESCRIPTION OF THE FIGURES

Further details and advantages result from an embodiment shown in the drawing.

FIG. 1 is a schematic perspective total view of a mobile crane with a lateral guying in accordance with a preferred embodiment of the invention;

FIG. 2 is a sectional plan view of the telescopic boom and its lateral guying of the mobile crane of FIG. 1;

FIG. 3 is a schematic detailed view of a weight support on an undercarriage of a mobile crane;

FIG. 4 is a schematic view of a partly extended stabilizer plate of a mobile crane;

FIG. 5 is a schematic plan view from above of a part of the undercarriage with partly extended stabilizer plates; and FIGS. 6 and 7 are different setup conditions of installable lattice booms.

DETAILED DESCRIPTION

Figure 8:
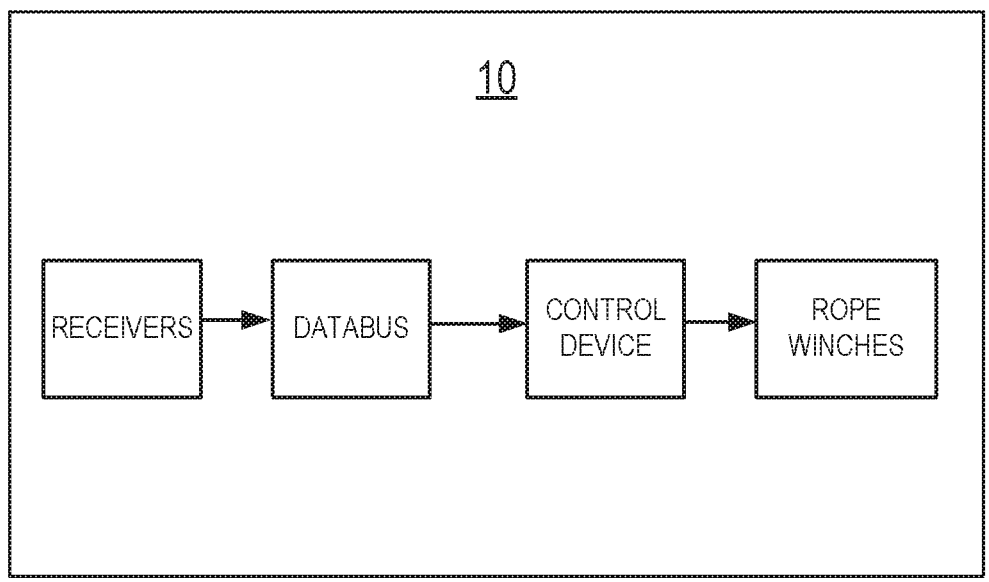
FIG. 8 schematically shows an exemplary mobile crane, which may correspond to the mobile crane shown in FIG. 1.

FIG. 1 shows a mobile crane 10 comprising a telescopic boom 12 which is rotatably hinged to the vehicle about an upright axis of rotation and is luffably hinged about a horizontal axis. The telescopic boom 12 has a hinged section 14, which is hinged to the vehicle in the named manner, as well as further telescopic sections 16 and 18 which can be telescoped out of the hinged section 14. A guying 20 of the telescopic boom 12 is guided over a pair of guy supports 22. Guying-ropes 24 lead from the free end of the guy supports 22 to the tip of the telescopic boom 12, with it naturally also being possible to guide the guy-ropes 24 at the head of the central telescopic section 16, for example. The guy supports 22 are in turn captured via guy-ropes 26 in the region of the hinge end of the hinged section 14.

The guy supports 22 are movably hinged to the head of the hinged section 14, and indeed such that they are folded in a transport position at the hinged section 14, whereas they are spread apart in V shape in the manner shown in an operating position.

As shown in FIG. 2, the guy supports 22 can each have a pulley block 28 at their heads via which the guy-ropes 24 stopped at the boom tip are guided. The guy-ropes 24 run over rope winches 30 which are each supported at one of the guy supports 22. The rope winches 30 serve as rope stores, on the one hand, and the tensioning and holding of the guy-rope, on the other hand.

A plurality of transducers or transponders 32 are secured to the guy-ropes 24, with their being formed in the embodiment shown here as rings or sleeves which are seated on the outer periphery of the respective guy-rope 24 at specifically pre-determined positions. The transponders 32 are spaced apart from one another so that different rope lengths can be adjusted. The spacings of the transponders 32 from the stop point of the guy-rope 24 at the tip of the telescopic boom 12 are the same in pairs so that the rope lengths of the right hand guying and of the left hand guying can be adjusted identically.

To be able to sense the position of the transponders 32 and thus to be able to determine the effective rope length between the guy support 22 and the stop point of the guy-rope 23 at the boom, receivers units 34 are arranged at each guy support 22. The system of transducer 32 and receiver unit 34 is a system known as such in the prior art consisting of a transponder 32 and reader 34 of an RFID system (radio frequency identification system). Such systems on the basis of the physical principle of induction are already known per se. In the corresponding transponders 32 in the example shown here, the precise information of the rope positions is stored at which said transponders are arranged. They are then read out at the receiver unit 34 when sliding by accordingly during the tensioning of the guy-rope 24.

The procedure can be as follows on the guying of the telescopic boom. When the telescopic sections 16 and 18 of the telescopic boom 12 are extended, the rope winches 30 are switched to pulling out so that the guy-ropes 24 can run off the rope winches 30 on the pushing out of the telescopic sections 16 and 18. When the telescopic sections 16 and 18 have reached their extended position, they can be latched to one another. The guy-ropes 24 are then tensioned via the rope winches 30. The guy-ropes 24 are hauled in by a distance until the corresponding transducer 32 has reached a pre-determined position which is sensed by the receiver unit 34. The control unit stops and latches the rope winches 30 in dependence on the corresponding signal of the receiver unit 34 so that the guy-rope is held in the corresponding position.

A further embodiment in accordance with the invention is shown in FIG. 3. The partial view of a weight support on an undercarriage of a mobile crane is shown purely schematically here. A part of the undercarriage 40 of a mobile crane not shown in any more detail is indicated purely schematically, with ballast weights 42 being placed on said part of the undercarriage. The ballast weights 42 each have integrated transponders 44 which, in the present embodiment, communicate with receiver devices 46 which are arranged at corresponding positions of the undercarriage 40. The correspondingly received signal is forwarded by the receiver devices in a manner not shown in any detail here to the central control unit of the mobile crane where the data are processed.

In FIG. 4, the schematic view of a partly extended stabilizer plate 48 of a mobile crane is shown. The stabilizer plate 48 can be refracted or extended in the direction of the double arrow a. The position of the stabilizer plate 48 is determined by transponders 50 which are arranged at pre-determined positions of the telescopic part 52 of the stabilizer plate 48. For this purpose, the transponders 50 cooperate with the receiver device 56 arranged at the fixed-position part 54 of the stabilizer plate 48. The corresponding position of the stabilizer plate can be supplied to the control computer of the mobile crane again via a bus system not shown in any more detail here after the received transponder signal.

A further application of the present invention results from the application example in accordance with FIG. 5.

The chassis 58 of a mobile crane is shown schematically there at which, for reasons of simplification, only two lateral stabilizer plates 48 are indicated which can in turn be telescoped in or out in the direction of the double arrow a. A receiver device 60 is shown centrally in the region of the vehicle chassis 58 and cooperates with a transponder not shown in any more detail here which is carried by an operator 62. The transponder is carried, for example, in that the operator carries a remote control device for the remote control of the different functions of the mobile crane. As soon as the transponder carried by the operator is in the region of the receiver device 60, the remote control functions are released so that, for example, the stabilizer plates 48 can be moved in or out in the direction of the arrow a. It is hereby reliably prevented that the operator is located in a dangerous zone, i.e. for example in a region in which he would be hit by the refracted or extended stabilizer plates 48.

In FIG. 6, a further application possibility of the invention within the framework of a bus condition detection is shown by way of example. Here, a lattice mast 70, for example of a installable derrick boom, is shown which consists of four individual elements 72, 74, 76 and 78. Each of these elements has a different geometrical configuration and a different center of gravity. The corresponding lattice elements 72, 74, 76 and 78 can be connected to one another at corresponding bolting points 78 and 80. The corresponding data of the corresponding lattice elements 74, 76 and 78 can be transmitted via transponders 82, which are associated with the respective lattice elements 72, 74 and 76, to respectively adjacently arranged receiver devices 84, each arranged in the lattice elements 72, 74 and 76 respectively in the embodiment shown here, using an RFID system in accordance with the invention. The corresponding data are supplied from the receiver devices 84 to the control system of the mobile crane via a bus not shown in any more detail here. After a corresponding assembly, the current bus condition can therefore automatically be precisely detected. The transponders 82 cooperate here with adjacent receiver elements 84 which are arranged in the respectively adjacent lattice element. The respective arrangement of the transponders 82 or the receiver elements 84 is standardized in the embodiment shown here. Pluggable transitions for the bus are associated at the transition positions of the lattice elements and the signals are forwarded via them.

In FIG. 7, a setup condition detection not shown in detail is integrated which serves for the detection of the geometrical configuration in lattice elements of different geometrical design such as are shown here with reference to lattice elements 90, 92 and 94. The geometry of the additionally installed lattice boom is therefore here determined automatically by the respective transponders associated with the lattice elements 90, 92 and 94 by transmitting the corresponding data strings to the system control.

FIG. 8 schematically shows a mobile crane 10 which includes receiver units, a databus, a control device, and rope winches.

The details and features of the invention shown by way of example in the embodiments with reference to a telescopic crane can be used in the same manner with a crawler-mounted crane.

The invention claimed is:

1. A mobile crane comprising:
    a lattice boom comprising a plurality of lattice elements;
    a detection device comprising a plurality of inductively operating transponders arranged at the lattice elements and a plurality of receiver units arranged at the lattice elements, each transponder of the plurality of inductively operating transponders configured to transmit information to a corresponding receiver unit of the plurality of receiver units, the corresponding receiver unit arranged at an adjacent lattice element and configured to sense the transponder;
    a control device configured to control the crane in dependence on signals of the plurality of receiver units; and
    a databus configured to transmit the information from the plurality of receiver units to the control device;
    wherein each transponder of the plurality of inductively operating transponders is an RFID transponder configured to transmit back the information stored thereon as a modulated RF signal, and wherein each receiver unit of the plurality of receiver units is an RFID reader comprising a digital electronic system that controls the RFID transponder to transmit back the information.

2. The mobile crane in accordance with claim 1, wherein positions of the lattice elements of the lattice boom are determined by the control device after assembly of the lattice elements based on the information transmitted from the receiver units to the control device by the databus.

3. The mobile crane in accordance with claim 2, wherein a geometrical configuration of the crane is automatically determined by the control device based on the positions of the lattice elements of the lattice boom.

4. The mobile crane in accordance with claim 2, wherein a weight distribution within the lattice boom is calculated by the control device based on the positions of the lattice elements of the lattice boom.

5. The mobile crane in accordance with claim 1, wherein the lattice elements each have a different geometrical configuration and a different center of gravity.

6. The mobile crane in accordance with claim 1, wherein the lattice boom is a derrick boom, and wherein the detection device is configured to detect at least one pre-defined state or position within the crane.

7. The mobile crane in accordance with claim 1, further comprising a mobile transducer that cooperates with a receiver unit arranged at a pre-determined position on the crane in order to detect a safe position of an operator and to release pre-determined actions of the crane.

8. A mobile crane comprising:
  a lattice boom comprising a plurality of lattice elements;
  a detection device comprising a plurality of inductively operating transponders including a first inductively operating transponder arranged at a first lattice element and a plurality of receiver units including a first receiver unit arranged at a second lattice element, the first inductively operating transponder configured to transmit information to the first receiver unit, and the first receiver unit configured to sense the first inductively operating transponder;
  a control device configured to control the crane in dependence on signals of the receiver units; and
  a databus configured to transmit information from the receiver units to the control device;
  wherein each inductively operating transponder is an RFID transponder configured to transmit back the information stored thereon as a modulated RF signal, and wherein each receiver unit is an RFID reader comprising a digital electronic system that controls the RFID transponder to transmit back the information.

9. The mobile crane in accordance with claim 8, wherein the first lattice element is adjacent to the second lattice element, and wherein the detection device is configured to detect at least one pre-defined state or position within the crane.

10. The mobile crane in accordance with claim 9, wherein adjacent lattice elements of the plurality of lattice elements are connected to one another at bolting points.

11. The mobile crane in accordance with claim 8, wherein positions of the lattice elements of the lattice boom are determined by the control device after assembly of the lattice elements based on the information transmitted from the receiver units to the control device by the databus.

12. The mobile crane in accordance with claim 8, wherein a geometrical configuration of the crane is automatically determined by the control device based on positions of the lattice elements of the lattice boom.

13. The mobile crane in accordance with claim 8, wherein a weight distribution within the lattice boom is calculated by the control device based on positions of the lattice elements of the lattice boom.

14. The mobile crane in accordance with claim 8, wherein the lattice elements each have a different geometrical configuration and a different center of gravity.

15. The mobile crane in accordance with claim 8, wherein the lattice boom is a derrick boom.

16. The mobile crane in accordance with claim 8, wherein at least one inductively operating transponder further includes a mobile transducer that cooperates with a receiver unit arranged at a pre-determined position on the crane in order to detect a safe position of an operator and to release pre-determined actions of the crane.

17. A method for a mobile crane, comprising:
  determining a setup condition of a derrick boom after an assembly of lattice elements of the derrick boom, the determination including reading out signals sent by RFID transponders arranged at the lattice elements to corresponding RFID readers, the RFID readers connected to a control computer of the crane via a databus; and
  determining a geometrical configuration of the crane based on the setup condition of the derrick boom.

18. The method of claim 17, further comprising calculating a weight distribution within the derrick boom with the control computer based on the setup condition of the derrick boom.

19. The method of claim 17, wherein each RFID transponder is arranged at a lattice element adjacent to a lattice element at which the corresponding RFID reader is arranged.

20. The method of claim 17, further comprising continuously monitoring functioning of a position detection device of the crane with an RFID transponder fixedly installed in an RFID reader, the RFID transponder installed in the RFID reader transmitting a pre-determined function signal.

* * * * *